United States Patent Office 2,779,757
Patented Jan. 29, 1957

2,779,757

METAL-CONTAINING AZO DYESTUFFS

Hans Ruckstuhl, Basel, and Walter Wehrli, Riehen, Switzerland, assignors, by mesne assignments, to Saul & Co., Newark, N. J., as nominee of Fidelity Union Trust Company No Drawing. Application June 28, 1954,
Serial No. 439,918

Claims priority, application Switzerland July 7, 1953

4 Claims. (Cl. 260—151)

The present invention relates to new metal-containing azo dyestuffs and to a process for their preparation.

The new metal-containing azo dyestuffs correspond in their metal-free form to the general formula

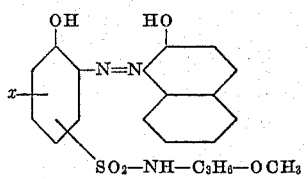

wherein $x$ stands for hydrogen, chlorine or methyl.

Of especial value are the so-called 1:2-metal complex compounds, which correspond to the general formula

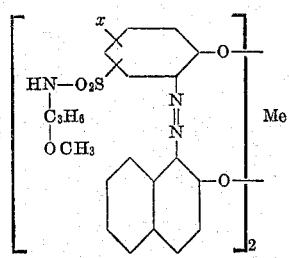

wherein $x$ stands for hydrogen, chlorine or methyl, and Me stands for chromium or cobalt.

The new metal-containing azo dyestuffs are obtained by coupling 1 mol of the diazo compound of a 2-amino-1-hydroxybenzene-sulfonic acid-(3'-methoxy)-propylamide, which may have a chlorine atom or a methoxy group as a substituent on the benzene nucleus, with 1 mol of 2-hydroxynaphthalene, and treating the thus-obtained monoazo compound with a chromium or cobalt-yielding agent.

Coupling of the diazo compound with 2-hydroxynaphthalene is with advantage carried out in an alkaline medium, and the working-up and isolation of the product so obtained may be carried out in the usual way.

Conversion of the monoazo compound into the chromium- or cobalt-containing azo dyestuff may be carried out by means of chromium salts such as chromic fluoride, chromic sulfate, chromic formate, chromic acetate, potassium or ammonium chromic sulfate and sodium or potassium chromate or dichromate, or by means of cobalt salts such as cobaltous acetate, cobaltous formate and cobaltous sulfate, the conversion being effected in aqueous dispersion or solution, in an organic solvent such as formamide or in a fused alkali metal salt of a lower aliphatic monocarboxylic acid. In the latter case, there may be used insoluble heavy metal compounds such as the hydroxide or carbonate of cobalt. It is of particular advantage to carryout the metallization in aqueous caustic alkali medium and to add the metal salt in the presence of such compounds as are capable of forming soluble complex compounds with cobalt and chromium in aqueous caustic alkali medium, such as tartaric acid, citric acid and lactic acid. Metallization is carried out in such a manner that about one metal atom combines with two molecules of monoazo compound.

The metal-containing azo dyestuffs so obtained, if necessary after pouring the organic metallizing solution into water, are thrown out of aqueous solution by addition of salt, then filtered off, washed if desired and then dried.

The deystuffs possess an outstanding power of exhaustion for wool in neutral baths. They dye wool fibers even from a neutral dyebath, and silk from a weakly acid dyebath, in level full shades of Bordeaux red and violet, very fast to fulling and washing and of excellent light-fastness. They are also suitable for dyeing leather and are especially suitable for dyeing artificial nitrogen-containing fibers such as polyamide fibers, e. g. nylon and Perlon. Because of the good solubility of the new dyestuffs in polar solvents such as acetone, dimethylformamide and tetrahydrofurane, they may moreover be used for dyeing synthetic fibers obtained by spinning from organic solvent solution, e. g. acetate silk and Dacron.

The following examples illustrate the invention without being limitative. The parts given are by weight, the percentages are percentages by weight and the temperatures are given in degrees centigrade.

EXAMPLE 1

26 parts of 2-amino-1-hydroxybenzene-4-sulfonic acid-(3'-methoxy)-propylamide are dissolved in 150 parts of water and 20 parts of 30% hydrochloric acid. The resulting solution is cooled to 5° by means of ice, whereupon there is added an aqueous solution of 6.9 parts of sodium nitrite. The resulting diazo compound solution is poured at 10° into a solution formed from 15 parts of 2-hydroxynaphthalene, 15 parts of a 30% solution of sodium hydroxide, 25 parts of sodium carbonate and 250 parts of water. After the coupling reaction is complete, the separated monoazo compound is filtered off.

The paste so obtained is stirred into 400 parts of water. 40 parts of a 30% solution of sodium hydroxide are added to the dispersion, and a solution of 15 parts of cobaltous sulfate crystals in 80 parts of water are added dropwise to the dispersion at 80–85° over a period of 30 minutes. The resulting solution of the cobalt complex of the azo dyestuff is allowed to cool to room temperature and then 150 parts of sodium chloride are added thereto. The resulting suspension is warmed to 60° and the cobalt-containing azo dye-stuff is filtered off at this temperature and then dried. It is a dark reddish-brown powder which dissolves in concentrated sulfuric acid with a violet-red coloration and has very good solubility in water to give bluish-red solutions. It corresponds to the formula

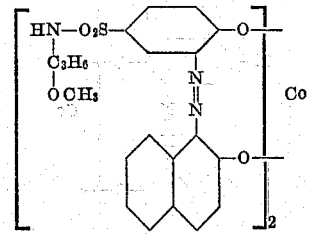

and dyes wool, silk, leather and synthetic polyamide fibers from a neutral or acetic acid bath in full shades of Bordeaux red of outstanding fastness to light, fulling and washing.

The new dyestuff also possesses very good solubility in acetone and can be used for dyeing cellulose acetate masses.

For producing the chromium complex compound, the monoazo compound paste formed as described above, is dried and ground. The resulting material is heated for 8 hours at 95° in 500 parts of formamide with a mixture of 25 parts of sodium acetate and 40 parts of ammonium chromic sulfate. The reaction mixture is allowed to cool to 20-25°, then poured into 700 parts of water and filtered after precipitating out the chromium complex compound by the addition of 50 parts of sodium chloride. The filter cake is taken up at room temperature in a solution formed from 45 parts of 30% sodium hydroxide solution and 600 parts of water. After stirring for several hours, 150 parts of sodium chloride are added to the mixture, whereupon the chromium-containing dyestuff is again filtered off. When dry, this dyestuff is in the form of a dark violet-brown powder, which dissolves in concentrated sulfuric acid to give a violet coloration, and in water to give a reddish-violet solution. It corresponds to the formula

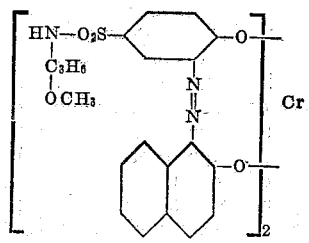

and dyes wool, silk, leather and synthetic polyamide fibers from a neutral or acetic acid bath in full, dull shades of violet having outstanding fastness to light, fulling and washing.

In the table which follows, further metal-containing dyestuffs are given which may be prepared as described in Example 1 and which are characterised by means of the diazo component used and the shade of dyeing given on wool, the azo component in each case being 2-hydroxy-naphthalene.

Table

| Example No. | 2-amino-1-hydroxybenzene sulfonic acid-(3'-methoxy)-propylamide. | Shade of dyeing on wool | |
|---|---|---|---|
| | | Chromium complex compound | Cobalt complex compound |
| 2 | 2-amino-1-hydroxy-4-chlorobenzene-5-sulfonic acid-(3'-methoxy)-propylamide. | reddish blue-grey. | violet. |
| 3 | 2-amino-1-hydroxy-4-methyl-benzene-5-sulfonic acid-(3'-methoxy)-propylamide. | ....do........ | Do. |

The formula of the metal-containing azo dyestuff according to the representative Example 2 is the following:

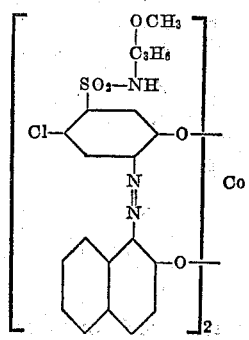

EXAMPLE 4

1 part of anhydrous sodium sulfate and 0.2 parts of the chromium-containing azo dyestuff described in Example 1 are dissolved in 500 parts of water. 10 parts of pre-wetted wool are introduced into the dyebath at 30°, and the temperature of the dyebath is raised to 100° within 15 minutes. The dyebath temperature is maintained at 100° for 60 minutes, and 0.2 part of concentrated acetic acid is gradually added to the bath during the course of the dyeing treatment. When the dyeing treatment has finished, the wool, dyed a dull shade of violet, is removed from the dyebath, rinsed in water and dried.

Synthetic polyamide fibers are dyed in like manner, but silk is, however, dyed at a somewhat lower temperature, e. g. at 95°.

Having thus disclosed the invention, what is claimed is:

1. A metal-containing azo dyestuff which corresponds to the formula

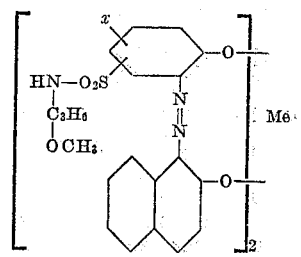

wherein $x$ stands for a member selected from the group consisting of hydrogen, chlorine and methyl, and Me stands for a metal atom selected from the group consisting of chromium and cobalt.

2. The metal-containing azo dyestuff which corresponds to the formula

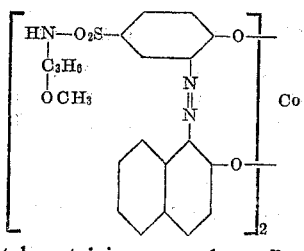

3. The metal-containing azo dyestuff which corresponds to the formula

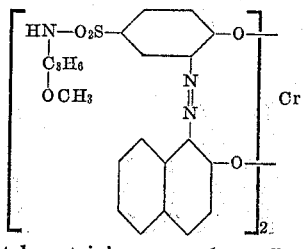

4. The metal-containing azo dyestuff which corresponds to the formula

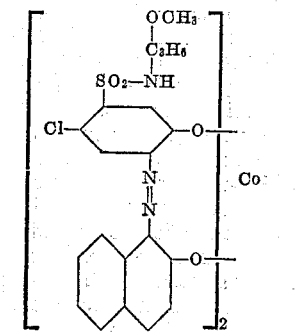

References Cited in the file of this patent

UNITED STATES PATENTS

| 1,821,938 | Hentrich et al. | Sept. 8, 1931 |
| 2,033,341 | Krzikalla et al. | Mar. 10, 1936 |
| 2,683,707 | Brassel | July 13, 1954 |

FOREIGN PATENTS

| 126,460 | Great Britain | May 9, 1919 |